United States Patent
Friebe et al.

(10) Patent No.: US 9,755,513 B2
(45) Date of Patent: Sep. 5, 2017

(54) BIDIRECTIONAL DC CONVERTER COMPRISING A CORE WITH PERMANENT MAGNETIZATION

(71) Applicant: SMA Solar Technology AG, Niestetal (DE)

(72) Inventors: Jens Friebe, Vellmar (DE); Klaus Rigbers, Kassel (DE); Sebastian Lederer, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 70 days.

(21) Appl. No.: 14/610,536

(22) Filed: Jan. 30, 2015

(65) Prior Publication Data

US 2015/0171751 A1    Jun. 18, 2015

Related U.S. Application Data

(63) Continuation of application No. PCT/EP2013/065772, filed on Jul. 25, 2013.

(30) Foreign Application Priority Data

Aug. 2, 2012  (DE) ........................ 10 2012 107 101

(51) Int. Cl.
  *H02M 3/158*  (2006.01)
  *H02M 1/00*  (2006.01)

(52) U.S. Cl.
  CPC .......... *H02M 3/158* (2013.01); *H02M 3/1582* (2013.01); *H02M 2001/0064* (2013.01); *Y02B 70/1425* (2013.01)

(58) Field of Classification Search
  CPC ....................................... H02M 3/158–3/1588
  See application file for complete search history.

(56) References Cited

U.S. PATENT DOCUMENTS 6,239,584 B1 * 5/2001 Jang ..................... H02M 3/158
                                                            323/222
9,300,209 B2 * 3/2016 Mueller ................ H02M 3/158
                      (Continued)

FOREIGN PATENT DOCUMENTS

EP        2299569 A1    3/2011
JP        2006114662    4/2006

OTHER PUBLICATIONS

S. Waffler and J. W. Kolar, "Comparative evaluation of soft-switching concepts for bi-directional buck+boost dc-dc converters," Power Electronics Conference (IPEC), 2010 International, Sapporo, 2010, pp. 1856-1865.*

(Continued)

*Primary Examiner* — Harry Behm
*Assistant Examiner* — Peter Novak
(74) *Attorney, Agent, or Firm* — Eschweiler & Associates, LLC

(57) ABSTRACT

The disclosure relates to a DC/DC converter including at least one clocked switching member and at least one inductor which is arranged between an input connection and an output connection of the DC/DC converter and is for intermediate storage of energy transferred by the DC/DC converter, wherein the inductor has a core with permanent magnetization. The DC/DC converter is configured for bidirectional operation, wherein, in a first energy transfer direction, the at least one switching member is switched in a first operating mode and, in a second energy transfer direction which is opposite to the first, the at least one switching member is switched in a second operating mode which deviates from the first. The disclosure also relates to an operating method for a DC/DC converter.

17 Claims, 7 Drawing Sheets

(56) References Cited

U.S. PATENT DOCUMENTS

| | | | |
|---|---|---|---|
| 2007/0052397 A1 | 3/2007 | Thompson et al. | |
| 2010/0148587 A1* | 6/2010 | Khaligh | H02M 1/10 307/72 |
| 2011/0068713 A1* | 3/2011 | Hoogzaad | H05B 33/0815 315/307 |

OTHER PUBLICATIONS

F. Z. Peng, Hui Li, Gui-Jia Su and J. S. Lawler, "A new ZVS bidirectional DC-DC converter for fuel cell and battery application," in IEEE Transactions on Power Electronics, vol. 19, No. 1, pp. 54-65, Jan. 2004.*

Baek, et al. "Digital Control of Synchronous Buck Converter with Multi-Mode for Wide Load Range." IEEE 7th International Power Electronics and Motion Control Conference. Jun. 2-5, 2012.

International Search Report dated Sep. 2, 2014 for International Application No. PCT/EP2013/065772.

* cited by examiner

BIDIRECTIONAL DC CONVERTER COMPRISING A CORE WITH PERMANENT MAGNETIZATION

FIELD

The disclosure relates to a DC voltage converter comprising at least one clocked switching member and at least one inductor for intermediate storage of energy transferred by the DC voltage converter arranged between an input connection and an output connection of the DC voltage converter, wherein the inductor has a core with a permanent magnetization. The disclosure also relates to a method for operating such a DC voltage converter and to an inverter which has such a DC voltage converter.

BACKGROUND

Converters converting direct current to direct current are often used as an input stage of an inverter, for example. They are referred to below as DC/DC converters. They may be designed as a boost converter, a buck converter or a combined buck/boost converter. At least one clocked switching member is arranged in a power circuit of the DC/DC converter. Depending on the switching state of the switching member, electrical energy is converted into magnetic energy in the inductor and intermediately stored therein or said intermediately stored magnetic energy is converted back into electrical energy and output again by the DC/DC converter. By way of example, MOSFETs (metal-oxide semiconductor field-effect transistors), JFETs (junction gate field-effect transistors) or IGBTs (insulated gate bipolar transistors) or other transistors may be used as switching members.

In the case of a DC/DC converter, the switching member is usually clocked using a pulse-width-modulated (PWM) signal. Different operating modes of DC/DC converters are known, which operating modes differ in switching frequency and/or switching points in time respectively. Known operating modes may be the so-called CCM mode (continuous conduction mode), the DCM mode (discontinuous conduction mode), the boundary conduction mode (BCM) or the RPM method (resonant pole mode). An overview of various operating modes of voltage converters can be found in the document "Highly Efficient Inverter Architectures for Three-Phase Grid Connection of Photovoltaic Generators", K. Rigbers, Shaker Verlag, Aachen, 2011.

The amount of energy that can be intermediately stored in the inductor during one switching cycle is determined by the inductance value of said inductor at maximum magnetization. In order to achieve an inductance value which is as high as possible and at the same time of small installation size and with a low number of windings, inductors comprising a core composed of material with a high magnetic permeability are usually used. The core advantageously increases the inductance value only up to a saturation magnetization, the level of which depends on the selected core material. If the inductor with the core is operated in saturation, only the leakage inductance is still available for further energy absorption.

In the case of DC/DC converters which are operated unidirectionally and, correspondingly, in which energy only flows in one predefined direction during operation, for example from an input side to an output side, the core of the inductor is only magnetized in one magnetic direction during operation. In this case it is known to pre-magnetize the core of the inductor in the opposite magnetic direction, for example by using permanent magnets within the core. Usually the pre-magnetization doubles the magnetization range which can be used during operation of the inductor. However, for an opposite energy flow direction in the case of such a DC/DC converter, only a very small magnetization range would be available to the inductor until the core reaches its saturation magnetization. Moreover, only the low leakage inductance could additionally be used in this energy flow direction. Therefore DC/DC converters with pre-magnetization of the core of their inductors have only been used unidirectionally up to now.

Inverters of a photovoltaic installation are used to convert direct current supplied by a photovoltaic generator into alternating current for feeding into a power supply grid. Often there is the demand to also supply reactive power to the power supply grid. We could call the energy flow direction when feeding active power into the grid the "main energy flow direction". So in order to provide reactive power to the grid the DC/DC converter must be configured for a bidirectional operation in order to operate in a direction opposite to the main energy flow direction. This is especially the case if the DC-link is located—with respect to the main energy flow direction—upstream of the DC/DC converter or if the DC/DC converter also has the functionality of modelling the current shape.

SUMMARY

The present disclosure provides a DC/DC converter, in particular for use with an inverter, comprising an inductor with pre-magnetized core for intermediate storage of energy and nevertheless may be effectively operated in a bidirectional manner.

This disclosure includes a DC/DC converter, an operating method for a DC/DC converter and an inverter comprising a DC/DC converter comprising the features of the independent claims.

A DC/DC converter according to the disclosure is configured for bidirectional operation and may be called a two-quadrant converter. In a first energy transfer direction the at least one switching member is switched in a first operating mode and in a second energy transfer direction which is opposite to the first, the at least one switching member is switched in a second operating mode. The second operating mode is different from the first.

Owing to the type of construction of the DC/DC converter as a two-quadrant converter, in which the inductor is arranged between an input connection and an output connection of the DC/DC converter, the current flows in the opposite direction through the inductor in the two energy transfer directions. According to the disclosure the smaller usable magnetization range in the second energy transfer direction is at least partially compensated by the different operating mode. Thus, the bidirectional usage of a DC/DC converter comprising an inductor with pre-magnetized core is enabled. A somewhat lower effectiveness of the DC/DC converter in the second energy transfer direction is not too obstructive because the requirement to provide reactive power is usually only temporary.

In an advantageous embodiment of the DC/DC converter, the DC/DC converter comprises at least two clocked switching members, wherein a first switching member is arranged in series with the inductor and wherein a center node between the first switching member and the inductor is connected to a second switching member. This is a simple implementation of a two-quadrant converter.

In another advantageous embodiment of the DC/DC converter, the first operating mode is CCM and the second operating mode is DCM or BCM or RPM. These are suitable combinations of operating modes which permit an energy transfer with good efficiency in the first energy transfer direction, but also permit energy transfer in the second energy transfer direction by adjusting switching parameters, for example switching instants and switching frequencies.

In another advantageous embodiment of the DC/DC converter, a permanent magnet is arranged in the core of the inductor in order to achieve permanent magnetization. In one embodiment, the permanent magnetization may be greater than 80% or even greater than 90%, of a saturation magnetization of the core of the inductor. Due to the large permanent magnetization, a significantly smaller inductor may be sufficient to enable the same power transfer.

In another advantageous embodiment of the DC/DC converter, an additional inductor is arranged in series with the inductor, wherein the additional inductor may have a smaller inductance value than the inductor. The additional inductor is active in the first energy transfer direction and also in the second energy transfer direction. In this way, an effective minimum inductance value may be provided for the second energy transfer direction.

In particular, an inverter for photovoltaic installations may comprise a DC/DC converter according to the disclosure. In connection with an inverter the DC/DC converter may be used in the second energy transfer direction in cases in which reactive power is provided for the power supply grid according to one embodiment. A somewhat lower effectiveness of the DC/DC converter is not a hindrance in this case. In particular, when power is to be transferred/converted only temporarily (for example several minutes) in the second energy transfer direction, a slightly higher power loss compared to operation in the main energy transfer direction may be reasonable. A switchover between the two energy transfer directions and, correspondingly, the two operating modes may take place within a grid period of the power supply grid, with the result that the DC/DC converter is operated in the second operating mode only in that time section of a grid period in which reactive power flows.

A method according to the disclosure is used to operate a DC/DC converter comprising at least one clocked switching member and at least one inductor for intermediate storage of the energy transferred by the DC/DC converter, wherein the inductor has a core with permanent magnetization. The DC/DC converter is configured for bidirectional operation in a first energy transfer direction and a second energy transfer direction which is opposite to the first. In the first energy flow direction the at least one switching member is switched in a first operating mode and in the second energy transfer direction the at least one switching member is switched in a second operating mode. The second operating mode is different from the first. In the first energy flow direction a current flows through the inductor in one direction and in the second energy flow direction a current flows through the inductor in opposite direction. The method according to the disclosure has the same advantages as stated above when referring to the DC/DC converter according to the disclosure.

In an advantageous embodiment of the method, in the first operating mode, the at least one switching member is switched at a predefined constant switching frequency, whereas, in the second operating mode, the at least one switching member is switched at a variable switching frequency which is higher than the constant switching frequency of the first operating mode. The higher switching frequency makes it possible to transfer a high power in the second energy transfer direction, too. In one embodiment, the first operating mode is CCM and the second operating mode is BCM or RPM.

BRIEF DESCRIPTION OF THE DRAWINGS

The disclosure is explained in more detail below with reference to example embodiments on the basis of eleven figures, in which.

DETAILED DESCRIPTION

Figure 1:
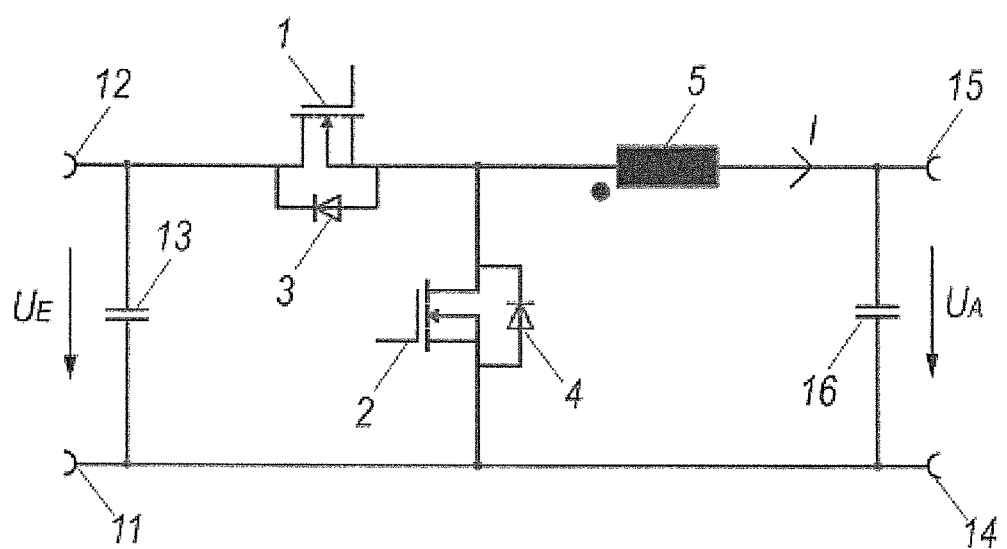
FIG. 1 shows a schematic circuit diagram of a first example embodiment of a DC/DC converter.

FIG. 1 shows a schematic circuit diagram of a DC/DC converter designed as a 2-quadrant converter in a first example embodiment.

The DC/DC converter has first connections 11, 12 connected to a current source or, alternatively, to a load. The DC/DC converter is configured to operate bidirectionally. A first energy transfer direction, which runs from left to right in the figure, is primary. The first energy transfer direction is also referred to as the main direction below. For simpler illustration, the first connections 11, 12 are referred to below as input connections 11, 12 since, during operation of the DC/DC converter in the main direction, they are the input connections of the DC/DC converter. A smoothing capacitor 13 arranged in parallel with the input connections 11, 12 is correspondingly an input capacitor.

Second connections 14, 15, which are arranged on the right-hand side of FIG. 1, are output connections when the DC/DC converter is operated in the main direction and are correspondingly also referred to below as output connections 14, 15 for reasons of simplification. A smoothing capacitor 16 connected in parallel with the output connections is referred to as an output capacitor. In the case of the example embodiment in FIG. 1, the input connection 11 and the output connection 14 are directly connected to one another. A series circuit composed of a first switching member 1 and an inductor 5 is arranged between the input connection 12 and the output connection 15. The center node between the first switching member 1, referred to below as first switch 1 for short, and the inductor 5 is connected to the input connection 11 or to the output connection 14 via a second switching member 2, referred to below as second switch 2 for short. In the main direction, that is to say in the event of energy flow from the input connections 11, 12 to the output connections 14, 15, a current I>0 flows through the inductor 5. In the main direction, the DC/DC converter of FIG. 1 is a buck converter, also referred to as step-down converter. The inductor 5, for example a coil, has a core with a permanent magnetization. The permanent magnetization, also referred to as pre-magnetization, may be caused by a permanent magnet inserted in the core, for example. The pre-magnetization has a polarity which opposes that polarity in which the core is magnetized during operation of the inverter in the main direction.

In a second energy flow direction which is opposite to the main direction and in which energy flows from the output connections 14, 15 to the input connections 11, 12, the DC/DC converter of FIG. 1 is a boost converter, also referred to as step-up converter. The second energy flow direction is referred to below as the auxiliary direction. A first freewheeling diode 3 is arranged in parallel with the switch path of the first switch 1 and a second freewheeling diode 4 is arranged in parallel with the switch path of the second switch 2.

Figure 2:
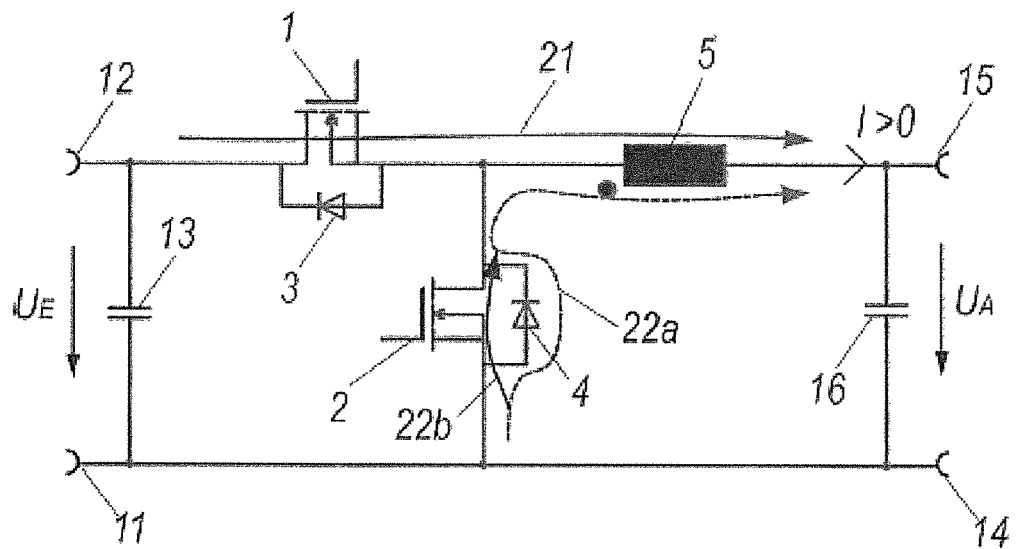
FIG. 2 shows the DC/DC converter of the first example embodiment with indicated current paths in a first operating mode.

In FIG. 2 in the DC/DC converter of FIG. 1 is presented when operated in the main direction, that is to say with a positive current I>0. In the main direction, the DC/DC converter is operated in a first operating mode, in which at least the first switch 1 is switched at a predefined constant frequency. The switching of the switch 1 and optionally of the second switch 2 is controlled by a control circuit which is not illustrated in the figures for reasons of clarity. If the first switch 1 is actuated (switched), current flows through the switch 1 along the current path 21 indicated in FIG. 2 through the inductor 5, as a result of which a magnetic field which superimposes the pre-magnetization is built up in the inductor. Accordingly, magnetic energy is stored in the magnetic field of the inductor 5. Since the core of the inductor 5 is pre-magnetized with a reversed polarity with respect to the magnetic field building up in the first operating mode, the magnetization range is increased by the level of pre-magnetization. Which means that the magnetic field that can be built up before the core is brought into the saturation is enlarged by the level of pre-magnetization. The magnetization range which is useable in the main direction may be at most double the saturation magnetization of the core. It is also possible to select a pre-magnetization which is smaller than the saturation magnetization, for example 10% smaller.

Figure 3:
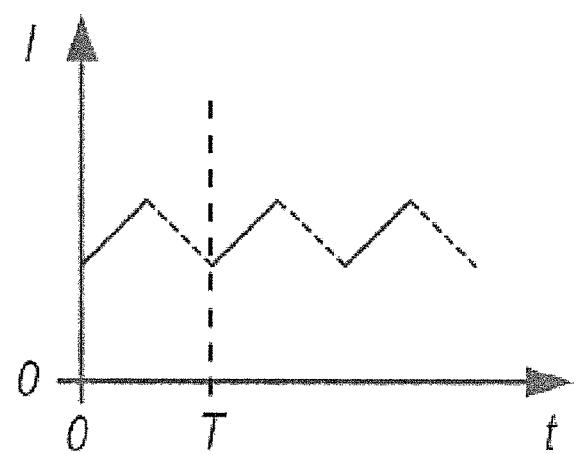
FIG. 3 shows a graph of the temporal dependence of a current profile in the case of the DC/DC converter in the first example embodiment and the first operating mode.

FIG. 3 schematically illustrates the profile of the current I as a function of time t in the first operating mode. During the first clock phase, in which the first switch 1 is switched and the current flows along the current path 21, the current I through the inductor 5 increases in a linear fashion. In a second switching phase, the first switch 1 is opened, upon which the current I commutates onto the second freewheeling diode 4, which is indicated by the current path 22a in FIG. 2. Subsequently, the current I decreases in a linear fashion, as can be seen in the dashed section of the current profile in FIG. 3. After the switching cycle has cycled to the period T, the first switch 1 is switched on again, upon which the current correspondingly increases in a linear fashion and flows along the current path 21 again. Consequently, in this first operating mode, either the first switch 1 or the second freewheeling diode 4 is conducting. One of these two elements is always in a conducting state at any instant, as a result of which this operating mode is also referred to as CCM (continuous conduction mode). In this case, the switching frequency is fixedly predefined. Owing to the high inductance value which is available in the main direction and to the increased magnetization range, the inductor can intermediately store a relatively large amount of energy. This expresses itself as a relatively slight variation in the current I within a period T.

In an alternative embodiment, provision is made to actively switch on the second switch 2 in the second clock cycle, with the result that the current in the second clock cycle does not conduct via the second freewheeling diode 4 but via the second switch 2, as indicated by the current path 22b in FIG. 2. This results in substantially the same current profile as illustrated in FIG. 3, with the advantage that on-state power losses are reduced owing to the lower volume resistance of the first switch 2 in comparison with the second freewheeling diode 4.

Figure 4:
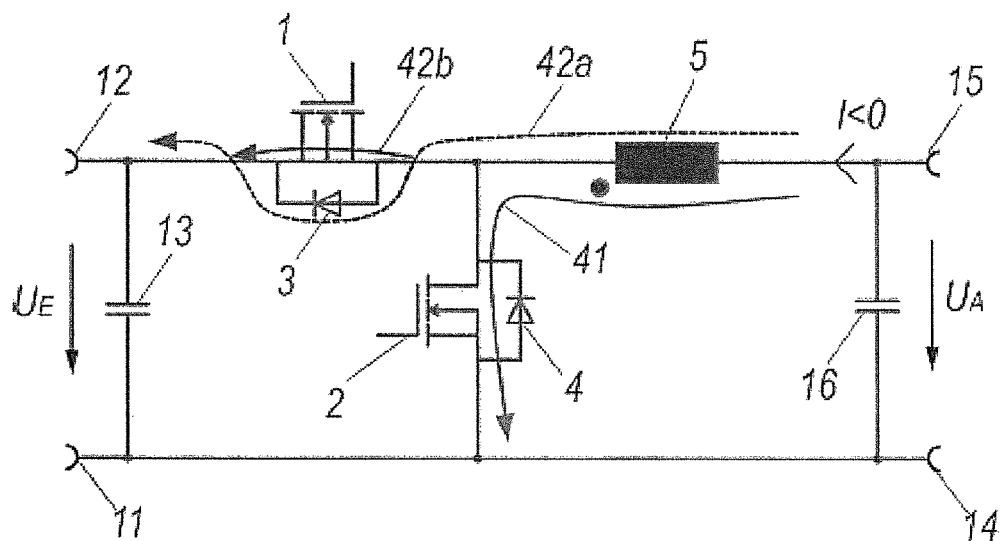
FIG. 4 shows the DC/DC converter of the first example embodiment with indicated current paths in a second operating mode.

In an illustration similar to FIG. 2, FIG. 4 shows the operation of the DC/DC converter of FIG. 1 in the auxiliary direction. Similarly to FIG. 3, temporal dependence of the flow of current I is given in the graph in FIG. 5.

In a first section of the switching cycle, the second switch 2 is actuated and becomes conducting. It correspondingly introduces a flow of current through the inductor 5 and the second switch 2, as symbolized in FIG. 4 by the current path 41.

In this first section of the switching cycle, the current I becomes negative (I<0), wherein its magnitude increases relatively sharply. This sharp increase—compared with the operation in the main direction (cf. FIG. 3)—results from the lower effective inductance value which the inductor 5 has owing to the pre-magnetization in the auxiliary direction. As soon as the saturation magnetization of the core is reached, only the leakage inductance is available for energy storage.

In a second clock phase, the second switch 2 is opened, upon which the current through the inductor 5 is commutated via the first freewheeling diode 3 and a flow of current is introduced via the input connections 11, 12. This is indicated by the current path 42a in FIG. 4. In an alternative embodiment, the first switch 1 may in turn be actively switched, with the result that it accepts the flow of current in the second clock phase instead of the first freewheeling diode 3. This is represented by the current path 42b. The resulting dependence of the current I on time corresponds to that shown in FIG. 5.

Owing to the smaller effective inductance value of the inductor 5 in the auxiliary direction, the current I already decreases to zero before the period T of a switching cycle. The flow of current I therefore shows significantly greater variations than in the case of operation in the main direction (cf. FIG. 3), which variations must be picked up by the smoothing capacitor 13. Regarding the switching members in question, the second switch 2 or the first freewheeling diode 3 or the first switch 1 are not conducting at all times and the current in the inductor 5 occasionally drops to zero, this operating mode is also referred to as DCM (discontinuous conduction mode). The DCM mode is connected with higher rms current values and peak current values than the CCM mode for the same arithmetic average current value, as a result of which on-state power losses may turn out to be higher. However, despite the smaller inductance, a comparatively large amount of energy can be transferred.

The DC/DC converter according to the disclosure or the method according to the disclosure for operating a DC/DC converter, in which the DC/DC converter is operated in different operating modes in the main and auxiliary direction, thus makes it possible that even a DC/DC converter in which an inductor with pre-magnetized core is used may be used bidirectionally. In the case of use of the DC/DC converter in connection with an inverter, the auxiliary direction is used only in exceptional cases in which reactive power is provided for the power supply grid by the inverter. A somewhat lower effectiveness of the DC/DC converter in the auxiliary direction is not a hindrance in this case. In particular when a power is to be transferred/converted only temporarily (for example several minutes) in the auxiliary direction, a power loss which occurs additionally compared to normal operation may also be taken into account by virtue of the thermal capacities of the inverter design. A switchover between the two energy transfer directions and, correspondingly, the two operating modes may take place in this case within a grid period of the power supply grid, with the result that the DC/DC converter is operated in the second, less effective operating mode only in that time section of a grid period in which reactive power flows.

Figure 6:
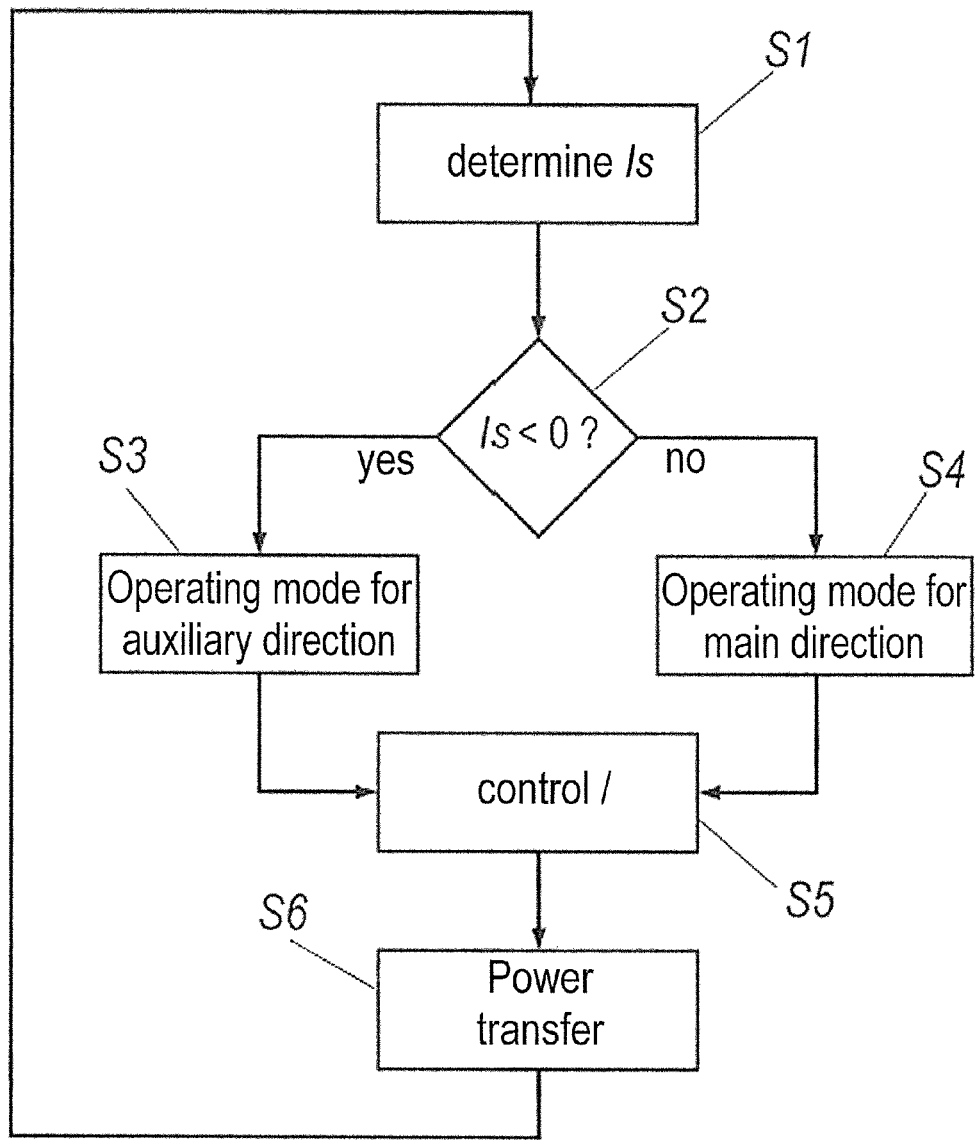
FIG. 6 shows a flow chart of an operating method of a DC/DC converter.

FIG. 6 shows, on the basis of a flowchart, an operating method for a DC/DC converter, for example the DC/DC converter shown in FIG. 1, for switching between the two energy transfer directions.

In a first act S1, a control device which is superordinate to the DC/DC converter determines a nominal current value $I_S$ for the DC/DC converter. A control step such as this is known in principle for DC-to DC converters and therefore requires no further explanation at this point.

The determined nominal current value $I_S$ is checked for its mathematical sign in a subsequent act S2. If the predefined nominal current value is greater than or equal to zero, the method is continued into a subsequent act S4. If the predefined nominal current value $I_S$ is less than zero, the method is continued with an act S3.

At S4, a control unit for the DC/DC converter, which may be integrated in the superordinate controller or may be embodied separately therefrom, is configured for operation of the DC/DC converter in the main direction. By contrast, at S3, the controller is configured for operation in the auxiliary direction. Correspondingly, markers or variables of the control unit are set such that operation takes place in the assigned operating mode, for example in the CCM operating mode in the main direction and the DCM operating mode in the auxiliary direction.

From both act S3 and act S4, the method then branches to an act S5 in which the switches of the DC-to DC converter are switched according to the set operating mode in order to control the current I to the predefined nominal current value $I_S$. Correspondingly, a power transfer takes place through the DC/DC converter, which power transfer is illustrated here at S6.

From act S6, the method branches back to act S1. The method is embodied in the form of an endless loop. The repetition frequency of the illustrated method acts S1 to S6 can be high enough that the operating mode is optionally changed multiple times during one grid period.

Figure 7:
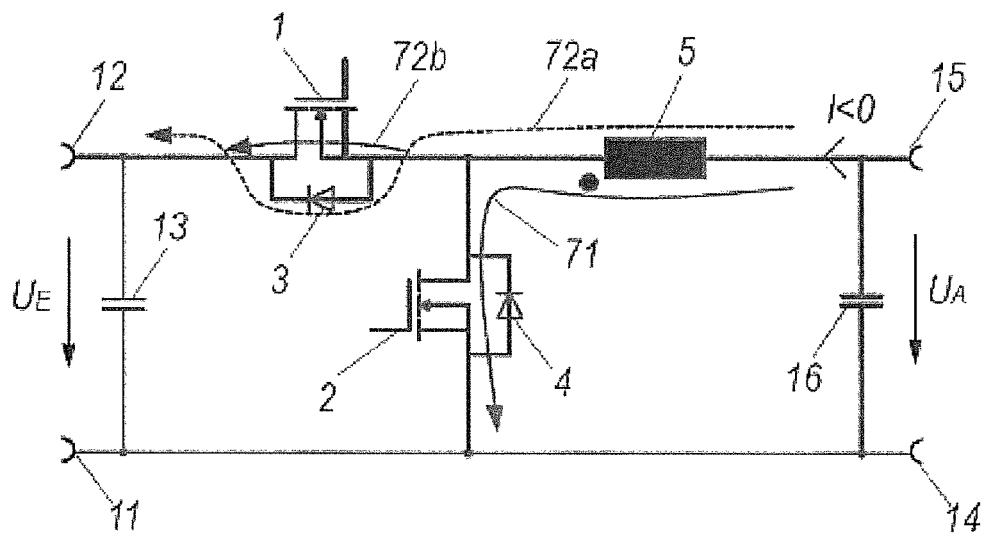
FIG. 7 shows the DC/DC converter of the first example embodiment with indicated current paths in an alternative embodiment of the second operating mode.

Similarly to FIG. 4, FIG. 7 illustrates the DC/DC converter of the first exemplary embodiment with arrows which symbolize the flow of current within the DC/DC converter in an alternative second operating mode. Similarly to FIG. 5, FIG. 8 shows the dependence on time of the current I emerging in the alternative second operating mode.

In turn, as in the embodiment of the second operating mode described in connection with FIG. 4, in this case an additional magnetic field is also alternatively built up in the inductor 5 by a current I<0 by the switch 2 being closed (current path 71) in a first time segment, and collapsed by a flow of current flowing via the first freewheeling diode 3 (current path 72a) in a second time segment in the event of an open second switch 2 or, alternatively, via the actuated, closed first switch 1 (current path 72b).

Figure 5:
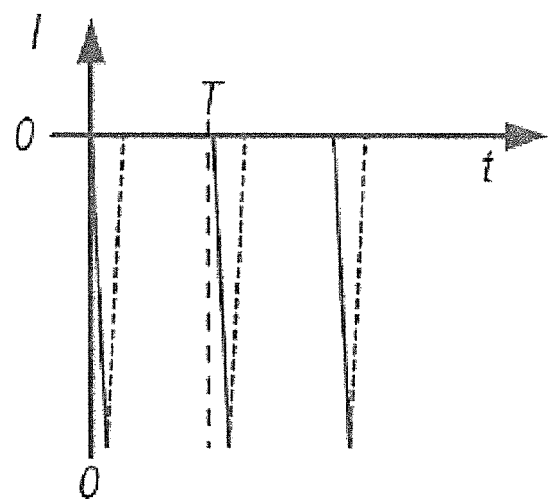
FIG. 5 shows a graph of the temporal dependence of a current of the DC/DC converter of the first example embodiment in the second operating mode.

In contrast to the example embodiment of FIGS. 4 and 5, in this case, the DC/DC converter is operated in the so-called boundary conduction mode (BCM). The third time section within the switching cycle in the case of the example embodiment of FIGS. 4 and 5 is omitted by no current I flowing through the inductor 5. Nevertheless, in order to be able to transfer the same power in temporal means, the switching frequency is increased in the case of the example embodiment of FIGS. 7 and 8. As can be seen in FIG. 8, a correspondingly shorter period T* emerges for a switching cycle. In one embodiment the adaptation of the switching frequency or the period T* takes place dynamically in this case by the first part of the switching cycle (second switch 2 closed) being started immediately when the current I in the second part of the switching cycle (current flow via the first freewheeling diode 3 or the closed first switch 1) decreases to zero. The switching frequency is therefore selected in the BCM mode such that the current I decreases straight to zero.

Figure 8:
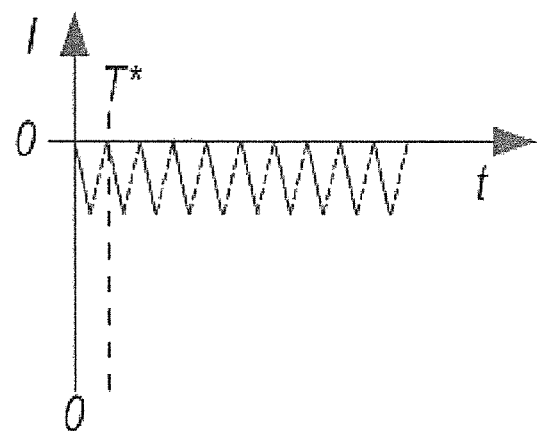
FIG. 8 shows a graph of the temporal dependence of a current of the DC/DC converter of the first example embodiment in the alternative embodiment of the second operating mode.
Figure 9:
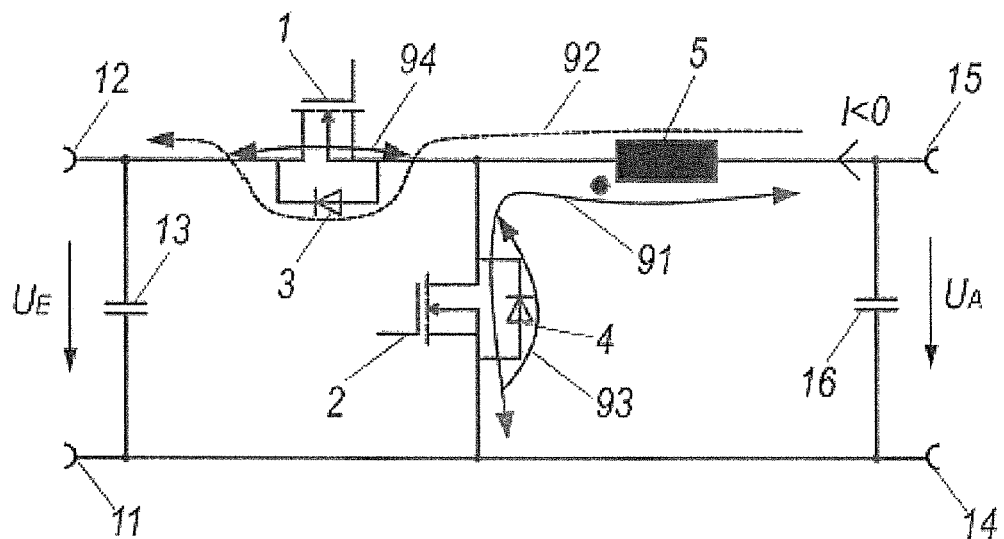
FIG. 9 shows the DC/DC converter of the first example embodiment with indicated current paths in a further alternative embodiment of the second operating mode.
Figure 10:
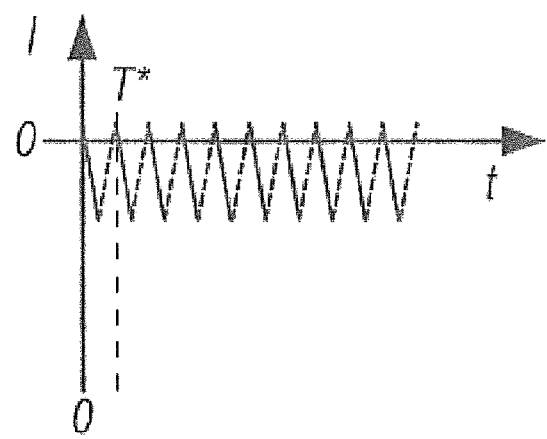
FIG. 10 shows a graph of the temporal dependence of a current of the DC/DC converter in the first example embodiment in the further alternative embodiment of the second operating mode.

In an identical manner to FIGS. 7 and 8, a further alternative second operating mode is specified in FIGS. 9 and 10. This is similar to the BCM mode of FIGS. 7 and 8, however the switchover from the second section of the switching cycle in which a flow of current runs (current path 92, 94) via the first switch 1 or the first freewheeling diode 3 to the first section of the (next) switching cycle in which energy deposition takes place in the inductor 5 by a flow of current via the second switch 2 or the second freewheeling diode 4 (current path 91, 93) does not take place in the event of a flow of current of I=0 but when, via the parallel circuit composed of the first switch 1 and the first freewheeling diode 3, a positive current I>0 measured in the main current direction is achieved temporarily in the inductance during operation in the auxiliary direction. This leads to reduced switching losses.

Thus, a de-energized switch-on of the switching members 1 and 2, which is associated with lower switching losses, is enabled for this switchover. This operating mode of a DC/DC converter is also referred to as RPM mode (resonant pole mode). In this operating mode, too, the switching frequency is variable and is dynamically adapted to the power to be transferred. In the event of a switchover of an energy transfer from the main direction to the auxiliary direction, the switching frequency is increased since only the smaller effective inductance is available in the auxiliary direction.

Figure 11:
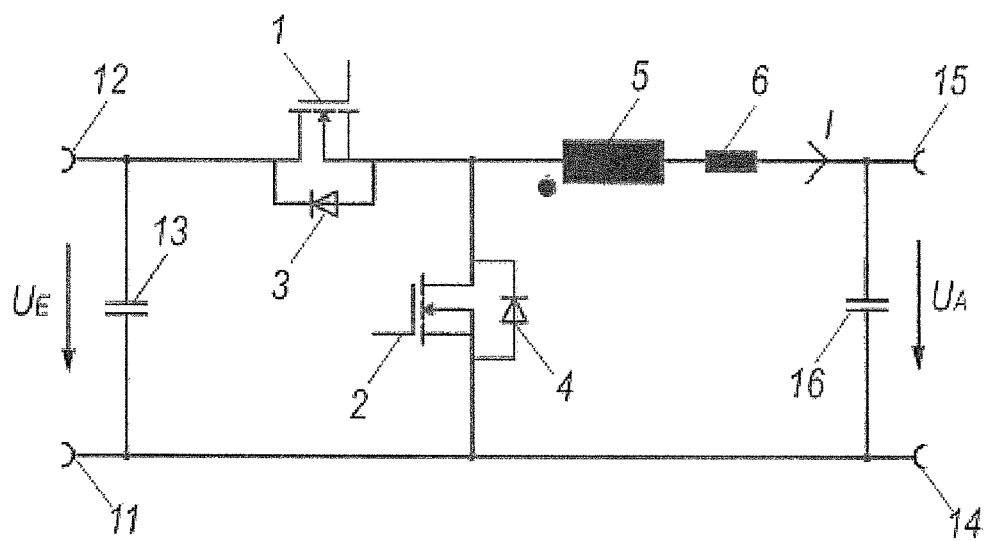
FIG. 11 shows a schematic circuit diagram of a second example embodiment of a DC/DC converter.

Similarly to FIG. 1, FIG. 11 shows a block diagram of a second exemplary embodiment of a DC/DC converter. In this case, identical reference signs denote identical or identically acting elements, as in the first exemplary embodiment. The DC/DC converter may be operated in the same operating modes as have been described in connection with the first example embodiment.

In contrast to the exemplary embodiment of FIG. 1, in this case an additional inductor 6 is arranged in series with the inductor 5. The additional inductor 6 may have a core which is, in one embodiment, either not pre-magnetized or is pre-magnetized with opposite polarity to the core of the inductor 5. The additional inductance therefore contributes at least in the auxiliary direction and, if it does not have a pre-magnetized core, also in the main direction to the overall inductance which is available for energy storage. In particular, in the auxiliary direction, a defined effective inductance is thus provided which is preferably greater than the leakage inductance of the inductor 5. Even if the inductor 5 is pre-magnetized by a maximum amount, such that only the leakage inductance is provided as effective inductance from the inductance in the auxiliary direction, the inductor 6 with its inductance value acts as effective inductance in the second operating mode.

The invention claimed is:

1. A DC/DC converter comprising:
   at least one clocked switching member; and
   at least one inductor for intermediate storage of energy transferred by the DC/DC converter, the at least one inductor arranged between an input connection and an output connection of the DC/DC converter, the at least one inductor providing a core with a permanent magnetization as a pre-magnetization having a polarity that is opposite of another polarity in which the core is magnetized during an operation in a main direction, wherein the DC/DC converter is configured for bidirectional operation, wherein, the at least one switching member is switched in a first operating mode in a first energy transfer direction, as the main direction, and the at least one switching member switched in a second operating mode in a second energy transfer direction which is opposite to the first energy transfer direction, wherein the second operating mode is different than the first operating mode, and wherein the at least one switching member is switched in the first operating mode in the first energy transfer direction with a lower switching frequency than in the second operating mode in the second energy transfer direction.

2. The DC/DC converter as claimed in claim 1, wherein the at least one switching member comprises at least two switching members, wherein a first switching member of the at least two switching members is arranged in a series circuit with the inductor, and wherein a center node between the first switching member and the inductor is connected to a further output connection via a second switching member of the at least two switching members.

3. The DC/DC converter as claimed in claim 1, wherein the first operating mode is a continuous conduction mode (CCM) and the second operating mode is a discontinuous conduction mode (DCM).

4. The DC/DC converter as claimed in claim 1, wherein the first operating mode is CCM and the second operating mode is a boundary conduction mode (BCM) or a resonant conduction mode (RPM).

5. The DC/DC converter as claimed in claim 1, wherein a permanent magnet is arranged in the core of the inductor in order to achieve the permanent magnetization.

6. The DC/DC converter as claimed in claim 1, wherein the permanent magnetization is greater than 80% of a saturation magnetization of the core of the inductor.

7. The DC/DC converter as claimed in claim 1, further comprising an additional inductor arranged in a series circuit with the inductor.

8. The DC/DC converter as claimed in claim 7, wherein the additional inductor has a smaller inductance value than the inductor.

9. The DC/DC converter of claim 7, wherein the additional inductor comprises a pre-magnetization of an opposite polarity to the core of the at least one inductor.

10. The DC/DC converter of claim 1, wherein the at least on inductor comprises a smaller effective inductance value in the second energy transfer direction as an auxiliary direction.

11. The DC/DC converter of claim 1, wherein the pre-magnetization of the core comprises the polarity that is a reverse polarity with respect to a magnetic field buildup in the first operating mode.

12. A method for operating a DC/DC converter comprising at least one switching member and at least one inductor for intermediate storage of the energy transferred by the DC/DC converter, wherein the inductor has a core with permanent magnetization wherein the permanent magnetization comprises a polarity that opposite of another polarity in which the core is magnetized during operation in a main direction, and wherein the DC/DC converter is configured for bidirectional operation with a first energy transfer direction, as the main direction, and a second energy transfer direction which is opposite to the first energy transfer direction, comprising:
   switching the at least one switching member according to a first operating mode to establish a first energy flow direction through the inductor and the core with the polarity that is opposite of the another polarity,
   switching the at least one switching member according to a second operating mode which is different than the first operating mode to establish a second energy flow direction in the inductor which is opposite from the first energy flow direction,
   wherein the at least one switching member is switched in the first operating mode in the first energy transfer direction with a lower switching frequency than in the second operating mode in the second energy transfer direction.

13. The method as claimed in claim 12, wherein the first operating mode is CCM and the second operating mode is DCM.

14. The method as claimed in claim 13, wherein the first operating mode is CCM and the second operating mode is BCM or RPM.

15. The method as claimed in claim 12, wherein in the first operating mode the at least one switching member is switched at a predefined constant switching frequency, and wherein in the second operating mode the at least one switching member is switched at a variable switching frequency which is higher than the constant switching frequency of the first operating mode.

16. A DC/DC converter configured for bidirectional operation, comprising:
   at least one switching member;
   at least one inductor comprising a core with a permanent magnetization, wherein the permanent magnetization comprises a polarity that opposite of another polarity in which the core is magnetized during operation in a main direction;
   wherein the at least one inductor is arranged between an input connection and an output connection of the DC/DC converter,
   wherein the at least one switching member is switched according to a first operating mode to establish a first energy transfer direction, as the main direction, through the inductor, wherein the at least one switching member is switched according to a second operating mode to establish a second energy transfer direction through the inductor, wherein the second energy transfer direction is opposite that of the first energy transfer direction, wherein the second operating mode is different from the first operating mode, and wherein the at least one switching member is switched in the first operating mode in the first energy transfer direction with a lower switching frequency than in the second operating mode in the second energy transfer direction.

17. The DC/DC converter of claim 16, wherein in the first operating mode the at least one switching member is switched at a predefined constant switching frequency, and wherein in the second operating mode the at least one switching member is switched at a variable switching frequency which is higher than the constant switching frequency of the first operating mode.

* * * * *